(12) United States Patent
Rafiee

(10) Patent No.: US 10,975,249 B1
(45) Date of Patent: Apr. 13, 2021

(54) NANOCOMPOSITE COATING FOR ANTENNA REFLECTOR AND METHODS OF MAKING SAME

(71) Applicant: Roham Rafiee, Tehran (IR)

(72) Inventor: Roham Rafiee, Tehran (IR)

(*) Notice: Subject to any disclaimer, the term of this patent is extended or adjusted under 35 U.S.C. 154(b) by 0 days.

(21) Appl. No.: 16/599,681

(22) Filed: Oct. 11, 2019

(51) Int. Cl.
| | |
|---|---|
| *C09D 5/24* | (2006.01) |
| *C09D 163/00* | (2006.01) |
| *C09D 7/80* | (2018.01) |
| *C09D 7/40* | (2018.01) |
| *H01Q 15/14* | (2006.01) |
| *H01Q 1/36* | (2006.01) |
| *B82Y 40/00* | (2011.01) |
| *C08K 3/04* | (2006.01) |

(52) U.S. Cl.
CPC .............. *C09D 5/24* (2013.01); *B82Y 40/00* (2013.01); *C09D 7/67* (2018.01); *C09D 7/80* (2018.01); *C09D 163/00* (2013.01); *H01Q 1/368* (2013.01); *H01Q 15/14* (2013.01); *C08K 3/042* (2017.05); *C08K 2201/001* (2013.01); *C08K 2201/011* (2013.01)

(58) Field of Classification Search
CPC .......... C09D 5/24; C09D 163/00; C09D 7/67; C09D 7/80; C08K 3/042; C08K 2201/011; C08K 2201/001; H01Q 15/14; H01Q 1/368; B82Y 40/00
USPC ........ 252/500, 510, 511; 977/778, 779, 785, 977/895, 897, 900
See application file for complete search history.

(56) References Cited

U.S. PATENT DOCUMENTS

2016/0376487 A1* 12/2016 Abramson .............. B32B 27/38
428/408
2020/0354220 A1* 11/2020 Pedersen ................. C04B 35/10

OTHER PUBLICATIONS

Rafiee "Enhanced Mechanical Properties of Nanocomposites at Low Graphene Content." ACSnano,3(12), p. 3884 et seq. (Year: 2009).*
Chatterjee "Mechanical reinforcement and thermal conductivity in expanded graphene nanoplatelets reinforced epoxy composites." Chemical Physics Letters 531 (2012) 6-10 (Year: 2012).*

* cited by examiner

*Primary Examiner* — Tri V Nguyen

(57) ABSTRACT

The present invention discloses a nanocomposite coating composition and coating method for antenna reflector. The nanocomposite coating composition comprises a polymer matrix resin and a plurality of graphene nanoparticles. The plurality of graphene nanoparticles is added to acetone solvent and dispersed using an ultrasonic disperser. An appropriate amount of prepared epoxy resin is added to the mixture of graphene and acetone solvent and stirred using a mechanical stirrer for certain period. The sonication process is applied to the graphene incorporated resin mixture for a duration of about 30-120 minutes. The acetone in the mixture is removed using a magnetic stirrer and a vacuum oven. Further, same hardener is added to the mixture and degassed using vacuum oven to form the nanocomposite coating composition. The nanocomposite coating composition converts an electromagnetically insulated antenna into an electromagnetically conductive antenna for enhancing one or more electromagnetic characteristics of the antenna reflector.

9 Claims, 8 Drawing Sheets

NANOCOMPOSITE COATING FOR ANTENNA REFLECTOR AND METHODS OF MAKING SAME

BACKGROUND OF THE INVENTION

The communication and broadcasting systems receive/transmit information in a form of signal from a satellite. Conventional systems use many types of antennas or antenna reflectors such as dish antennas and Rotman lenses, to transmit/receive signal in the form of electromagnetic waves from the satellite. The existing antenna reflectors are divided into two main groups namely, metallic antennas and composite antennas.

The metallic antennas are made of metallic materials or conductive materials, which are widely used in satellite communication based on their electromagnetic reflecting property. The metallic antenna is quite heavy and it either requires facilities for positioning in ground stations or it results in a considerable reduction in the payload for space stations. Moreover, the metallic materials transmit/receive the electromagnetic waves regardless of the frequency range. Hence, the metallic antennas are susceptible to cause electromagnetic interference, especially for satellite broadcasting. Thus, the composite antenna with low weight is designed as a next generation antenna using polymeric composite materials, which significantly reduces the weight of the antenna.

Despite the considerable weight reduction in the structure of the polymeric composite antenna when compared to the metallic antenna, the polymeric composites are intrinsically categorized under the electromagnetically insulated materials. Thus, a metallic mesh is incorporated between the composite layers to overcome the shortcomings in the electromagnetic properties. In this process, an accurate selection of depth between the composite layers is necessary to embed the metallic mesh between the composite layers. Moreover, a higher electromagnetic characteristic is expected from the higher density of mesh. The lower mesh densities can fulfill the requirements of electrical conductivity, but higher mesh densities are required when electromagnetic characteristics are intended to be improved. Therefore, the incorporation of high-density meshes within the small cells is necessary, which would increase the weight of antennas.

Some studies have focused on increasing the mechanical properties of polymer incorporating carbon nanotube or graphene. Some other studies have tried to increase the electrical conductivity of the polymeric materials using either carbon black or carbon fiber. These studies mainly consider the DC electrical conductivity and no attention has been given to the reflection or transmission of electromagnetic waves. In some very rare cases, the nanoparticles are incorporated into resin material for improving DC electrical conductivity as the main goal. The employed processing methods in those investigations are different from the current invention. In some cases, the nanoparticles are added into resin material while other conductive materials like carbon fiber, metallic films, or nano carbon ropes are used. In these cases, the nano-particle plays the role of increasing bonding between components, since electrical conductivity is improved with other mentioned materials.

Though existing prior art disclose certain graphene-based nanocomposite coatings, there exists a need for effectively converting an electromagnetically insulated polymer antenna into an electromagnetically conducting antenna. Also, there is a need for a coating method for a polymeric composite antenna to achieve the proper electromagnetic characteristics in a mentioned frequency band. Further, there is a need for satellite communication antennas that operate in a mentioned frequency band for proper and efficient transmission and reception of data without loss.

SUMMARY OF THE INVENTION

A nanocomposite coating composition for an antenna reflector is disclosed. In one embodiment, the antenna reflector is a polymeric composite antenna. The polymeric composite antenna has low weight compared to conventional metallic antennas used in satellite communication. In one embodiment, the nanocomposite coating composition comprises a polymer matrix resin and a plurality of graphene nanoparticles. In one embodiment, the plurality of graphene nanoparticles incorporated and dispersed into the polymer matrix resin. In one embodiment, the graphene incorporated polymer resin enhances one or more electromagnetic characteristics of the antenna reflector.

In one embodiment, the coating composition is configured to convert an electromagnetically insulated antenna into an electromagnetically conductive antenna to provide efficient electromagnetic characteristics for satellite communication. The graphene nanoparticles are incorporated into the polymer resin for operating the antenna reflector in a mentioned frequency band. In one embodiment, the antenna reflector operates in the Ku frequency band. The nanocomposite coating composition is fabricated with different weight fractions of graphene nanoparticles. In one embodiment, the nanocomposite coating composition is fabricated with 0.1%-3% weight fraction of graphene nanoparticles. In one embodiment, the weight fraction of graphene nanoparticles includes, but not limited to, 0.01%, 0.05%, 0.5%, 0.8%, 1%, 1.5%, 2%, 2.5%, and 3% of weight fraction.

In one embodiment, a method for preparing a nanocomposite coating composition for the antenna reflector is disclosed. At one step, a polymer resin is prepared by adding a hardener to an electrically insulated epoxy resin selected upon an organic synthetic compound. In one embodiment, the organic synthetic compound is Bisphenol-A. In one embodiment, the hardener is added to the resin at a ratio of about 1:10, wherein the mixture is stirred for a period of about 3 minutes. In one embodiment, the resin has a density of about 1.6 gr/cm3 with the viscosity of about 780 cP at room temperature. In one embodiment, the electrical conductivity of the polymer resin 10^-12 S/m.

At another step, a mixture of graphene and acetone solvent is prepared by dispersing a pre-defined amount of graphene to acetone solvent, wherein the mixture is dispersed properly using an ultrasonic disperser for a period of about 2-10 minutes. At another step, the polymer resin is added to the mixture of graphene to acetone solvent and stirred for a pre-defined period of time to form a graphene incorporated polymer resin mixture. In one embodiment, the graphene incorporated polymer resin mixture is stirred using a mechanical stirrer with 1700 RPM for a duration of about 15 minutes. In one embodiment, the graphene incorporated polymer resin mixture is subjected to ultrasonic bath to remove a plurality of air bubbles and improve the dispersion rate.

At another step, the sonication process is performed to the graphene incorporated polymer resin mixture while controlling the temperature with water and ice around the container. In one embodiment, the sonication process is performed for a period of about 30-120 minutes based on the weight fraction of the graphene nanoparticles. For more weight fraction of graphene nanoparticles, the sonication process is performed for a longer period of time. At another step, the acetone is evaporated from the mixture obtained from the previous step using a magnetic stirrer. At another step, the hardener is mixed to the mixture obtained from the previous step using a mechanical stirrer.

At another step, the mixture obtained from the previous step is degassed using a vacuum oven to obtain the nanocomposite coating composition. In one embodiment, the nanocomposite coating composition is fabricated with 0.01%-3% of graphene weight fraction. The nanocomposite coating composition converts an electromagnetically insulated antenna into an electromagnetically conductive antenna for enhancing one or more electromagnetic characteristics of the antenna reflector. In one embodiment, the nanocomposite coating composition is used for antenna reflectors used in specific applications such as satellite communication and broadcasting.

One aspect of the present disclosure is directed to a nanocomposite coating composition for an antenna reflector, comprising a plurality of graphene nanoparticles incorporated and dispersed into a polymer matrix resin, for enhancing one or more electromagnetic characteristics of the antenna reflector. In one embodiment, the coating composition is configured to convert an electromagnetically insulated antenna into an electromagnetically conductive antenna to provide efficient electromagnetic characteristics for satellite communication. In one embodiment, the antenna reflector is a polymeric composite antenna. In another embodiment, the antenna reflector operates in Ku frequency band. In one embodiment, the nanocomposite coating composition is fabricated with 0.01%-3% of graphene weight fraction.

Another aspect of the present disclosure is directed to a method of preparing a nanocomposite coating composition for an antenna reflector, comprising: a) preparing a polymer resin by adding a hardener to an epoxy resin selected upon an organic synthetic compound; b) preparing a mixture of graphene and acetone solvent by dispersing a pre-defined amount of graphene to acetone solvent using an ultrasonic disperser for a period of about 2-10 minutes; c) adding the polymer resin to the mixture and stirred for a pre-defined period of time to form a graphene incorporated polymer resin mixture; d) performing sonication process to the graphene incorporated polymer resin mixture; e) evaporating the acetone from the mixture obtained from step (d) using a magnetic stirrer; f) mixing the hardener to the mixture obtained from step (e) using a mechanical stirrer; and g) degassing the mixture obtained from step (f) using a vacuum oven to obtain the nanocomposite coating composition.

In one embodiment, the organic synthetic compound is Bisphenol-A. In another embodiment, the hardener is added to the polymer resin at a ratio of about 1:10 and stirred for a period of about 3 minutes. In one embodiment, the resin has a density of about 1.6 gr/cm3 with the viscosity of about 780 cP at room temperature. In another embodiment, the electrical conductivity of the polymer resin is $10^{\wedge}-12$ S/m. In one embodiment, the graphene incorporated polymer resin mixture is stirred using a mechanical stirrer with 1700 RPM for a duration of about 15 minutes. In another embodiment, the graphene incorporated polymer resin mixture is subjected to ultrasonic bath to remove air bubbles and improve the dispersion rate.

In one embodiment, the sonication process is performed for a period of about 30-120 minutes based on the weight fraction of the graphene nanoparticles. In another embodiment, the nanocomposite coating composition is fabricated with 0.01%-3% of graphene weight fraction. In another embodiment, the nanocomposite coating composition converts an electromagnetically insulated antenna into an electromagnetically conductive antenna for enhancing one or more electromagnetic characteristics of the antenna reflector.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

Figure 1:
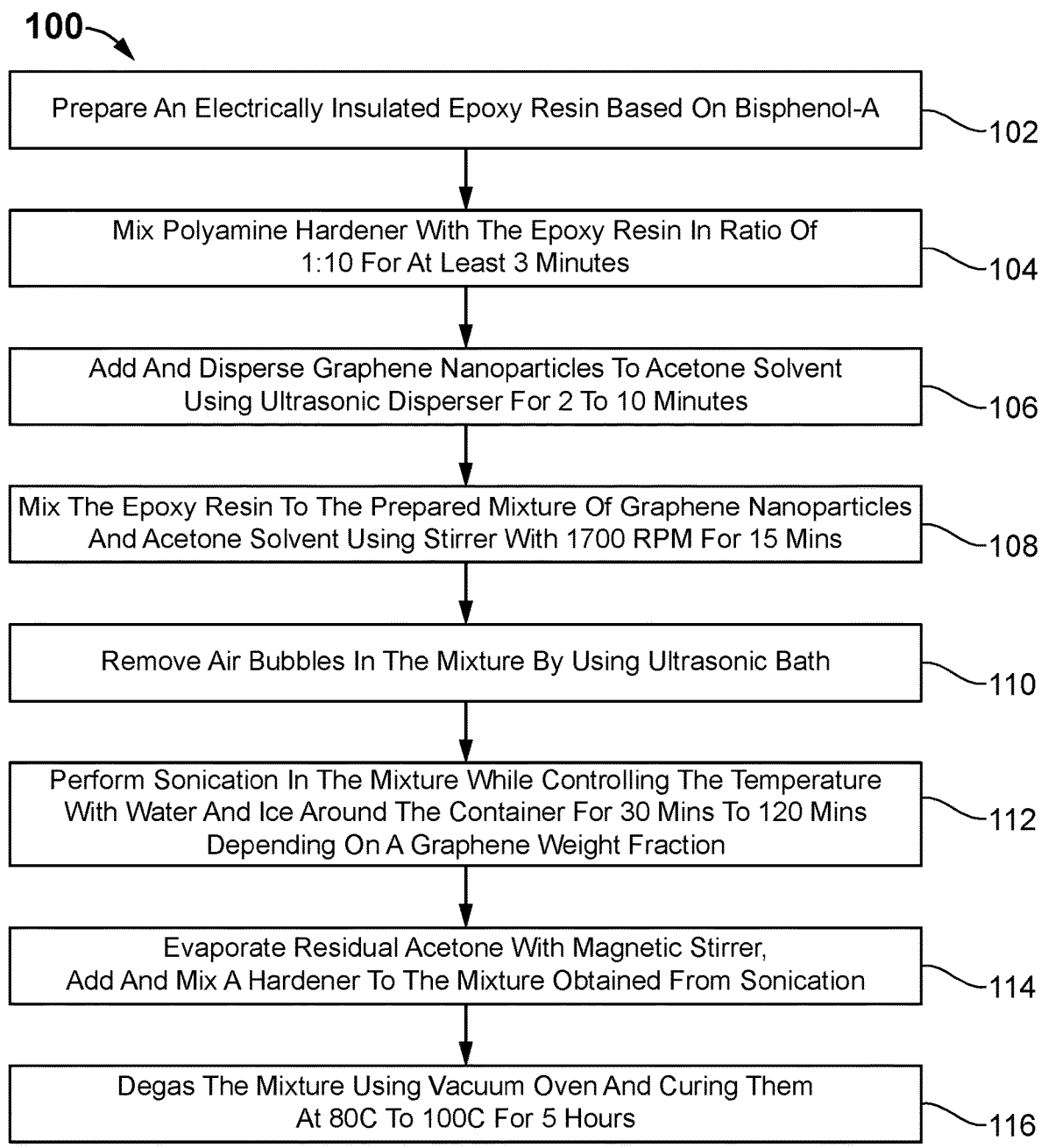
FIG. 1 exemplarily illustrates a method of preparing nanocomposite coating composition for an antenna reflector, according to an embodiment of the present invention.

The present invention generally relates to a composition and method for coating an antenna reflector. More particularly, the present invention relates to a polymer nanocomposite-based composition and coating method incorporating graphene nanoparticles for an antenna reflector used in satellite communications and broadcasting, thereby achieving proper electromagnetic characteristics in Ku frequency band for proper transmission and receiving of data without loss.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

According to the present invention, a nanocomposite-based composition and a coating method for an antenna reflector is disclosed. The present invention achieves proper electromagnetic characteristics in the antenna reflector for satellite communication and broadcasting. The antenna reflector used in satellite communication is applicable to both ground and space stations. The antenna reflector receives and reflects the electromagnetic waves from satellites with minimum loss and maximum efficiency. In one embodiment, the antenna reflector is made of a polymeric composite material with low weight.

In one embodiment, the nanocomposite coating composition comprises a plurality of graphene nanoparticles dispersed into a polymer resin. In one embodiment, the nanocomposite coating composition is developed for making the antenna reflector to operate in a mentioned frequency band with appropriate electromagnetic properties. The appropriate electromagnetic characteristics enable proper transmission and reception of data without loss. The electromagnetic properties of the antenna reflector depend on the selection of operating frequency band. In one embodiment, the antenna reflector operates in a Ku frequency band.

The Ku band is a portion of the electromagnetic spectrum in the microwave range of frequencies from 12 to 18 GHz. In one embodiment, the reflector antenna used in satellite communications have appropriate electromagnetic characteristics for transmitting and receiving the data without any loss at Ku frequency band. The satellites working in the Ku frequency band could stay close together and carry about 12 to 24 transponders with the power of about 20 to 120 W. In one embodiment, the antenna of Ku band satellites could have a diameter ranging from 91.44 to 182.88 cm. In North America, there are more than 20 Ku-band satellites are used, for example, PrimeStar, K-2, Satcom and AlphaStar.

In one embodiment, the Ku frequency band is used for satellite communications and broadcastings. For example, the direct broadcast satellites use downlink for broadcasting satellite televisions. Further, the Ku band satellites are used for various specific applications, for example, Tracking and Data Relay Satellite (TDRS) of NASA (National Aeronautics and Space Administration) is used for the space shuttle and International Space Station (ISS) communications. The Ku band satellites are also used for backhauls. Besides, the Ku band satellites are used for transferring data from satellite in remote locations to a television network's studio. The frequency band is split into multiple segments by the International Telecommunication Union (ITU), wherein each segment has a different frequency range based on the geographical region.

In one embodiment, the plurality of graphene nanoparticles is incorporated into polymer resin and dispersed properly for converting the electromagnetically insulated polymer into an electromagnetically conducting antenna. In one embodiment, the performance of the nanocomposite coating composition is assured by measuring the parameters such as a proper weight fraction of graphene nanoparticles, an appropriate dispersion procedure, and other effective parameters in the view of electromagnetic properties.

The effective parameters that govern electromagnetic behavior of the coating composition depends on the dispersion of nanoparticles in the polymer resin. In one embodiment, the effective parameters defining the electromagnetic behavior of the coating composition includes permittivity, transmission coefficient, reflection coefficient, loss tangent, and skin depth. In one embodiment, the effective parameters are experimentally evaluated for assuring the proper performance of the coating composition in the Ku frequency band.

Referring to FIG. 1, a method 100 of preparing the nanocomposite coating composition is disclosed, wherein the nanocomposite coating composition is prepared for antenna reflectors used in satellite communication and broadcasting. In one embodiment, an in-situ polymerization technique is employed for fabricating the nanocomposite coating composition. In one embodiment, the method 100 of preparing the nanocomposite coating composition comprises the following steps: At step 102, an electrically insulated epoxy resin material or a resin material is prepared based on an organic synthetic compound. In one embodiment, the organic synthetic compound is Bisphenol-A with the commercial code of ML-501.

The resin may have a density of about 1.6 gr/cm3 with the viscosity of about 780 cP at room temperature. The resin is categorized under the highly electrical-insulated material in comparison with the electrical conductivity of materials such as copper or titanium. The electrical conductivity of copper and titanium is $10^7$ and $10^6$ S/m, respectively. In one embodiment, the resin has the electrical conductivity measured $10^{-12}$ S/m. At step 104, a hardener is added to the electrically insulated epoxy resin to form the polymer resin. In one embodiment, the hardener is a polyamine hardener with the commercial name of HA-12. In one embodiment, the ratio of hardener and resin is about 1:10, wherein the composition is mixed for a duration of about 3 minutes.

At step 106, an appropriate weight fraction of graphene nanoparticles is added to acetone solvent to form a mixture of graphene and acetone solvent. In one embodiment, the graphene is Cicarbo™ graphene nanoplates with the grade of NCG015. The graphene comprises about 10 layers with a thickness of about 5 nm and the dimensions of 8 μm×8 μm. The graphene has a specific surface area of about 180 gm/m2 with the purity of about 99.8%. The appropriate amount of graphene is weighted with the digital balance having the accuracy of 1 mgr with respect to the intended weight fraction of graphene and added to the acetone solvent. In one embodiment, the weight of the acetone solvent is 30% of the weight of the resin. The mixture of graphene and acetone solvent is dispersed using a disperser for a certain period of time. In one embodiment, the disperser is an ultrasonic disperser. In one embodiment, the mixture of graphene and acetone solvent is dispersed for a period of about 2-10 minutes based on the graphene weight fraction.

At step 108, a certain amount of epoxy resin is added to the prepared mixture of graphene and acetone solvent obtained at step 106 and stirred together using a stirrer with 1700 RPM for a period of about 15 minutes. In one embodiment, the stirrer is a mechanical stirrer. At step 110, the graphene incorporated polymer resin mixture is subjected to ultrasonic bath to remove the air bubbles in the stirred mixture and improve the dispersion rate. At step 112, a sonication process is performed on the mixture obtained at step 110 while controlling the temperature with water and ice around the container for a certain period. In one embodiment, the duration of the sonication process is about 30-120 minutes.

The sonication period depends on the weight fraction of graphene, that is, the sonication process is performed for a longer duration in case of incorporating more graphene nanoparticles into the resin. In one embodiment, the Qsonica probe sonicator with a maximum power of about 700 Watts is utilized for the sonication process, and about 60% of maximum power is applied for different purposes such as temperature control and overheat protection. Further, the mixture of water and ice is used around the container having the mixture for controlling temperature and avoiding overheating.

At step 114, the residual acetone in the mixture is removed using a magnetic stirrer and the hardener is added to the mixture obtained from the sonication process at step 112, wherein the hardener is mixed to the mixture using a mechanical stirrer. At step 116, the mixture obtained at step 114 undergoes a degassing and curing process, wherein the degassing process is performed using a vacuum oven. In one embodiment, the curing process is performed at a temperature of about 80° C.-100° C. for a period of about 5 hours.

In one embodiment, multiple nanocomposite coating samples/specimens are fabricated with the dimensions of about 20 cm×20 cm×0.1 cm. The nanocomposite coating specimens are fabricated with various weight fractions of graphene nanoparticles. In one embodiment, the weight fraction of graphene nanoparticles in the polymer resin could be, but not limited to, 0.01%, 0.05%, 0.5%, 0.8%, 1%, 1.5%, 2%, 2.5% and 3% graphene weight fraction for adjusting the fabrication parameters properly.

The nanocomposite specimens are also fabricated based on the fabricating parameters with optimum values to investigate the maximum achievable electromagnetic conductivity. For this, initially, DC electrical conductivities of the specimens are examined to obtain the optimum required time for the sonication process. Further, the other specimens are fabricated for evaluating electromagnetic parameters.

According to the present invention, the method of analyzing the nanocomposite coating composition for the Ku frequency band is performed as follows. Initially, the electrical conductivity and a percolation threshold of the coating composition are defined. Based on the defined range of electrical conductivity and percolation threshold, the optimum status of fabrication parameters is obtained. The fabrication parameters are adjusted based on the defined range of electrical conductivity and percolation threshold and then, the coating specimens/samples are fabricated. The transmission/reflection coefficient and scattering parameters of coating specimens are measured using VNA. Using the transmission/reflection coefficient, the permittivity is calculated. Finally, the skin depth and loss tangent are calculated.

EXAMPLES

Example—1:—Electrical Conductivity

The electrical conductivity of the fabricated nanocomposite specimens is examined using a standardized four-point connection. A digital multimeter is employed to measure the current and resistance of the specimen/sample [2]. Upon the readings of the digital multimeter, the volume density is calculated using the equation (1). The volume density is used to calculate the electrical conductivity of the sample [2] using the equation (2):

$$\rho = RA/L \quad (1)$$

$$\sigma = 1/\rho \quad (2)$$

where "R" represents the electrical resistance (in $\Omega$), "$\rho$" represents specific volume density (in $\Omega$cm), "$\sigma$" represents DC electrical conductivity (in S/cm), "A" represents the area (in cm) and "L" represents the thickness of specimen (in cm).

Example—2:—Permittivity

The performance of the materials in electromagnetic environments is characterized using the complex permittivity [3]. The relative permittivity comprises a real part of complex permittivity or dielectric constant or energy storage, and an imaginary part of complex permittivity or dielectric loss. The complex permittivity is expressed as below [4]:

$$\varepsilon r = \varepsilon' + i\varepsilon'' \quad (3)$$

where $\varepsilon r$ represents complex relative permittivity, $\varepsilon'$ represents dielectric constant, and $\varepsilon''$ represents dielectric loss. The complex permittivity could be indirectly measured using scattering parameters with VNA (Vector Network Analyzer).

Example—3:—Skin Depth

The skin depth describes the capability of the electromagnetic field emitted in a material and indicates the minimum required thickness for transmitting the electric current. The specimens having with a lesser thickness of skin depth provides a higher reflection rate. Hence, the current is transmitted to the upper layers of the specimens, which leads to the improvement in the electromagnetic properties of the material. Therefore, the electric conductivity of the material depends on the skin depth and the frequency of the applied waves. A perfect electric conductor has zero skin depth. For instance, the skin depth of a good electric conductor such as aluminum in Ku frequency band is about 0.736 to 0.611 µm. The Ku frequency band has a frequency range from 12.4 to 18 GHz with a relative permeability of one and resistivity of 2.65e-8. The skin depth is expressed in terms of frequency, electrical conductivity, and electromagnetic permittivity as below [5]:

$$\delta = [\rho/(\pi f \alpha)]^{0.5} \quad (4)$$

where "$\rho$" represents resistivity ($\Omega$.m), "f" represents frequency (Hz), and "$\mu$" represents permeability (4 $\pi$e-7). This phenomenon of perfect electric conductors in high frequencies (microwave) resists the current to their depth and in return allows the current to pass through a very limited surface area.

Example—4:—Loss Tangent

The loss tangent describes the capability of a material in converting the stored energy into heat. The value of loss tangent implies on the wave absorbability of the material [6]. The loss tangent with high values and loss factor indicates the higher wave absorbability of the material [6], wherein the loss factor is the imaginary part of the permittivity. The loss tangent is calculated as below [7]:

$$\text{Tan}(\delta) = \varepsilon''/\varepsilon' = \sigma \varepsilon 0 \varepsilon r \quad (5)$$

where $\varepsilon''$ is the imaginary part of complex relative permittivity, and $\varepsilon'$ is the real part of complex relative permittivity denoted by Fr and expressed in equation (3). In the vacuum condition, the complex relative permittivity Fr is the dielectric constant and equivalent to 8.85e-12 F/m. $\sigma$ is the electrical conductivity. The AC electrical conductivity is also used for explaining the AC electromagnetic waves conductibility in composites [8]. The materials with Tan($\delta$) <<1 are known as the appropriate conductor and those with Tan($\delta$)<<1 are taken into account as the weak conductor.

Example—5:—Proper Duration of Sonication

In the sonication process, ultrasonic waves are applied to the mixture of graphene and polymer for certain duration.

Figure 2:
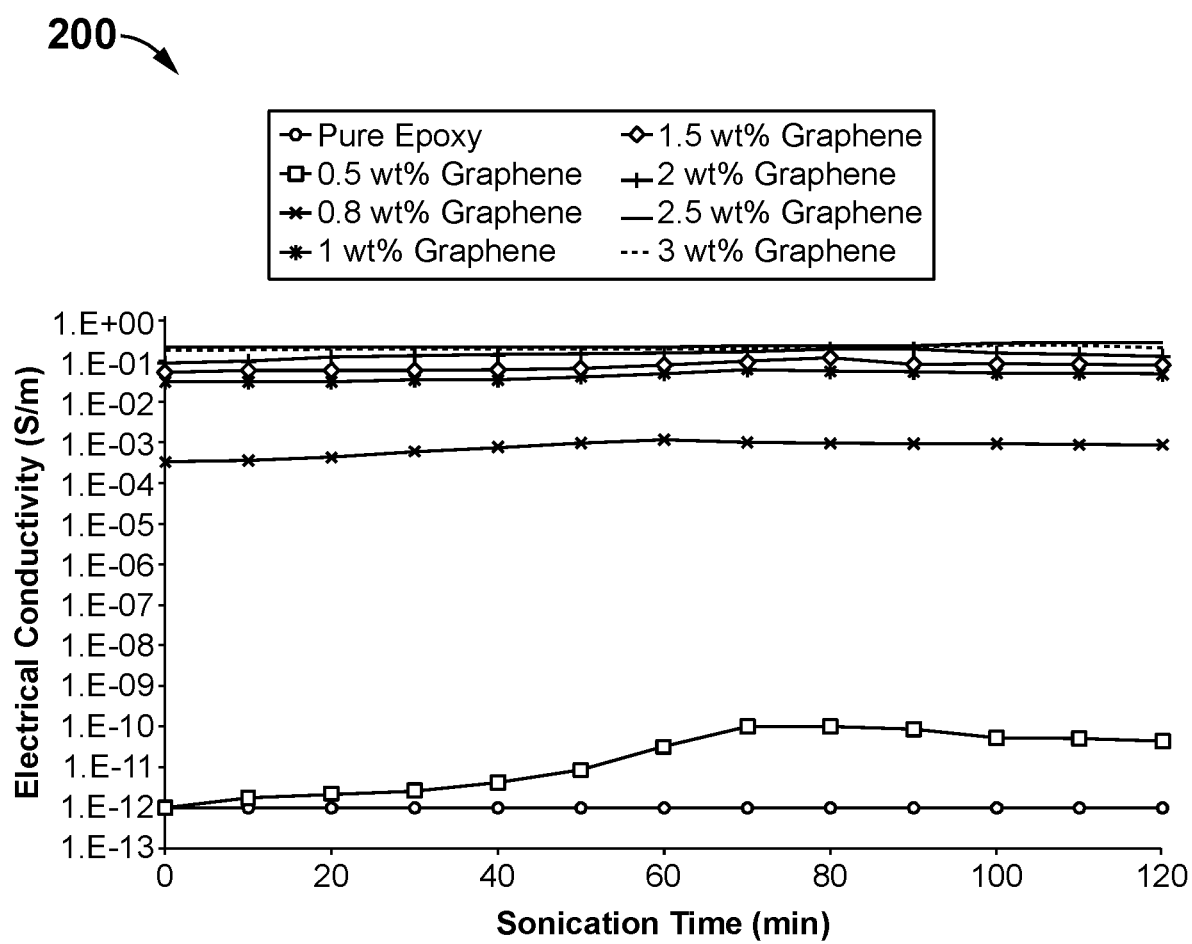
FIG. 2 exemplarily illustrates an effect of the sonication process on various electrical conductivities of sample/specimens with various graphene contents, according to an embodiment of the present invention.
Figure 3:
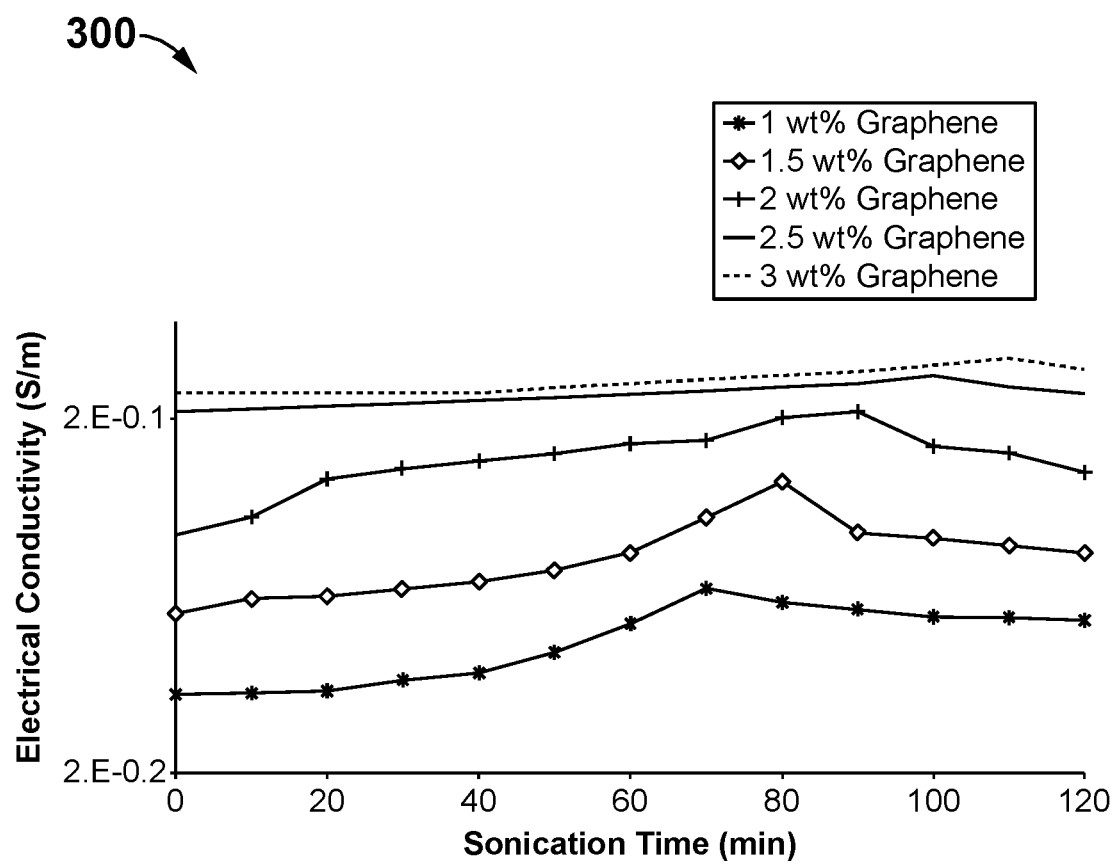
FIG. 3 exemplarily illustrates the effect of sonication process on various electrical conductivities of specimens having more than 1% of graphene contents, according to an embodiment of the present invention.

The duration of the sonication process plays a crucial role in dispersing graphene into polymer resin and avoiding local aggregate formation. Therefore, it is necessary to extract an appropriate time before fabricating the main coating composition. For this purpose, the DC electrical conductivity of samples is measured instead of imaging technique, thereby ensuring the suitable dispersion of the graphene in the polymer matrix. The proper dispersion in polymer matrix results in achieving the percolation threshold in fewer contents of graphene. The output discloses the most proper duration of the sonication process. FIGS. 2 and 3 describe the influence of ultrasonic duration on the electrical conductivities of samples having various range of graphene-based nanocomposite.

Referring to FIG. 2, the electrical conductivity 200 of each sample varies based on the weight fraction of graphene contents. The samples could have different weight fractions of graphene include, but not limited to, a pure epoxy resin without graphene, 0.5%, 0.8%, 1%, 1.5%, 2%, 2.5%, and 3%. Referring to FIG. 3, the electrical conductivity 300 of samples having more than 1% of graphene contents is disclosed. The weight fractions of graphene in samples include, but not limited to, 1%, 1.5%, 2%, 2.5%, and 3%. Among various samples, a peak is observed in the specimen than contains graphene nanoparticles. The samples with higher graphene content show a peak for a period of about 90 minutes, whereas the samples with lower graphene contents show a peak for a period of about 60 minutes.

After a period of the time, the aggregated graphene particles are broken and dispersed well into the polymer resin. The result disappears for the samples having the graphene contents below 0.8% and there are no improvements in the electrical conductivities of these samples. Further, the peak of samples with 2.5% and 3% of graphene weight fraction are not tangible. In these cases, the conductive network is rapidly constructed from the very beginning, where the quality of dispersion becomes less influential. In contrast, in the samples with lower contents of graphene, for example, 0.5%, the dispersion of graphene inside the polymer is required for constructing a conductive network, since local aggregated graphene particles are having a poor connection to each other.

In general, the electrical conductivity of the coating composition is enhanced by incorporating the graphene contents into the polymer resin, where the maximum achievable conductivity is considered as the proper dispersion point. Afterward, the ultrasonic wave is applied to cut the graphene content into smaller particles which results in truncating established conductive network path in the sample.

Figure 4:
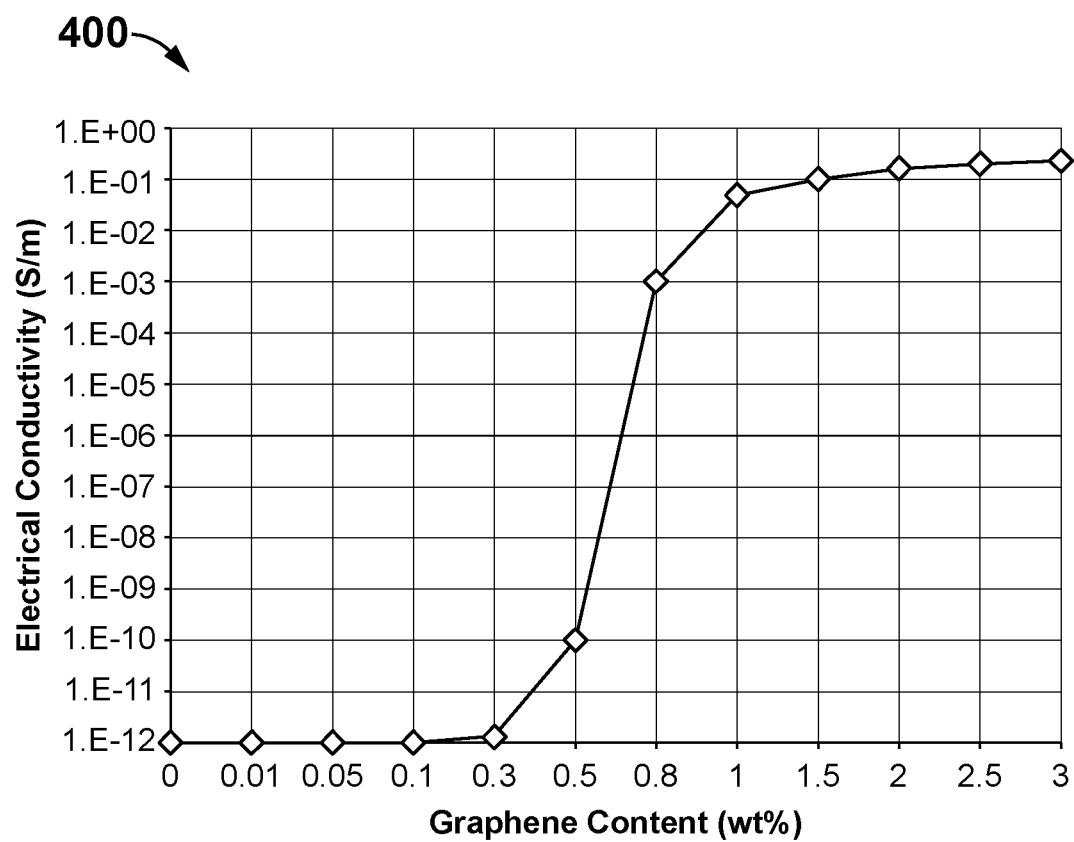
FIG. 4 exemplarily illustrates a DC electrical conductivity of a coating composition with respect to graphene content, according to an embodiment of the present invention.

Referring to FIG. 4, the DC electrical conductivity 400 of the fabricated samples with respect to graphene content is disclosed, wherein the weight fraction of graphene content various from 0 wt % to 3 wt %. By obtaining the appropriate time of applying the ultrasonic waves, the coating samples are fabricated for evaluating their electromagnetic performance. The electrical conductivity of the sample with 0.8% graphene has substantially increased in comparison with the samples accommodating lower contents of graphene.

This specific weight fraction (0.8%) is recognized as the percolation threshold. Before the percolation threshold, the polymeric matric dominates the electrical conductivity of nanoparticles while beyond the percolation threshold, the electrical conductivity is improved insignificantly. Moreover, the electrical conductivity of the pure resin is about $10^{-12}$ S/m. Further, the percolation threshold of $10^{-3}$ S/m is achieved by adding 0.8 wt % of CNTs.

Example—6:—Electromagnetic Properties

Figure 5:
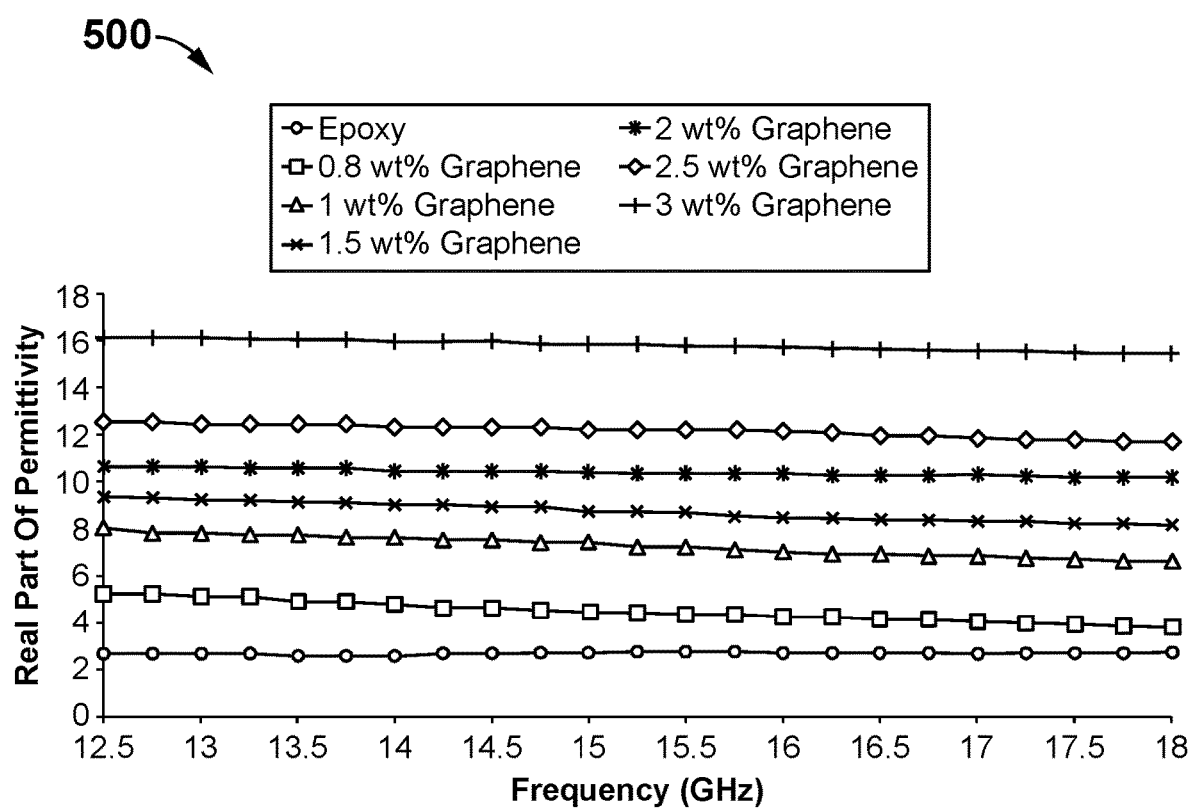
FIG. 5 exemplarily illustrates a real part of permittivity in the coating composition in Ku frequency band after applying sonication of about 90 min, according to one embodiment of the present invention.
Figure 6:
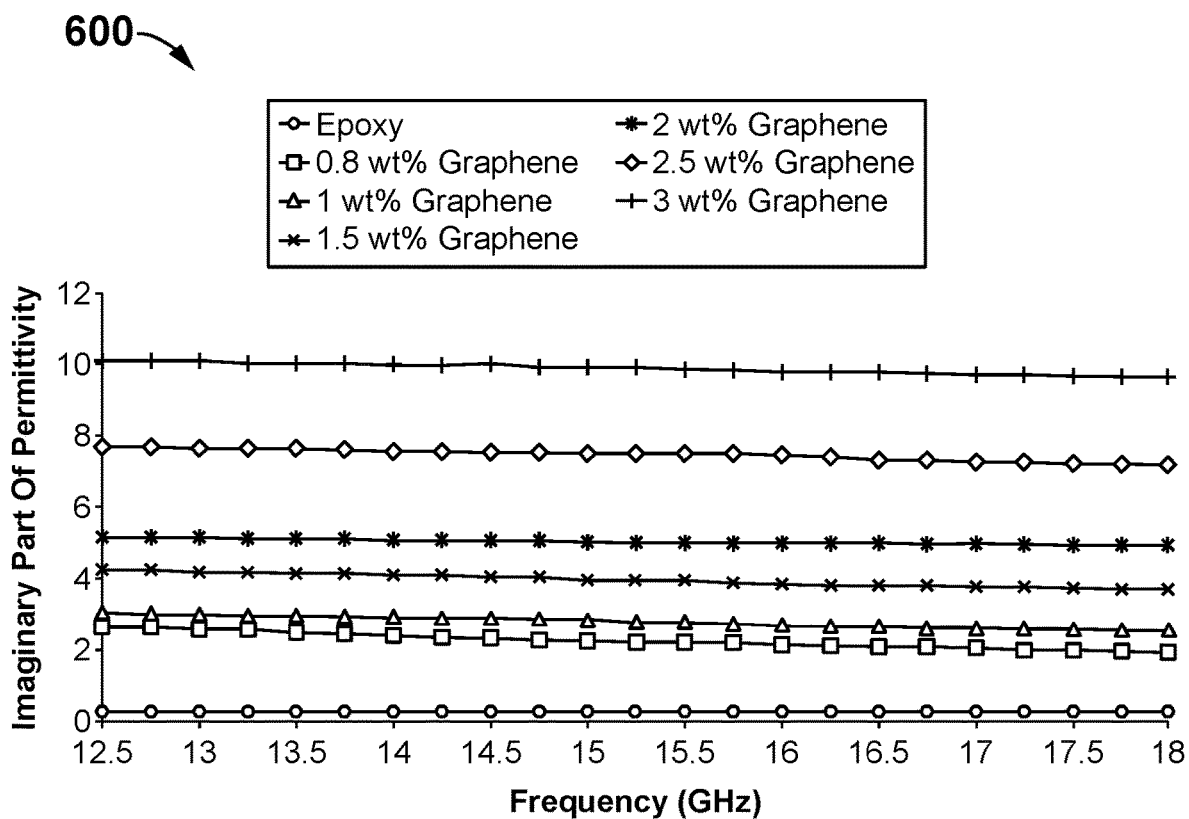
FIG. 6 exemplarily illustrates an imaginary part of permittivity in the coating composition in Ku frequency band after applying sonication of about 90 min, according to one embodiment of the present invention.

Referring to FIGS. 5 and 6, the real part 500 and imaginary part 600 of permittivity for different samples in Ku frequency band using VNA are disclosed respectively, where the samples are exposed to ultrasonic waves. In one embodiment, the samples are exposed to ultrasonic waves for a period of about 90 minutes. The real part of permittivity represents the dielectric constant and the imaginary part of permittivity represents the dielectric loss as an indicatory of the coating composition to absorb waves.

The appropriate coating could have lower permittivity, where the real and imaginary parts of the permittivity are required to be close. The fabricated coating composition has very close real and imaginary parts of the permittivity, especially at higher frequencies, as shown in FIGS. 5 and 6. Any increase in dielectric loss will result in the coating composition with high absorbability, which is not suitable for the reflective antenna. In the fabricated coating composition, the dielectric loss decreases by increasing the frequency. The coating composition with 3% graphene could have the real and imaginary parts of the permittivity as 16 and 10, respectively, in Ku frequency band.

Figure 7:
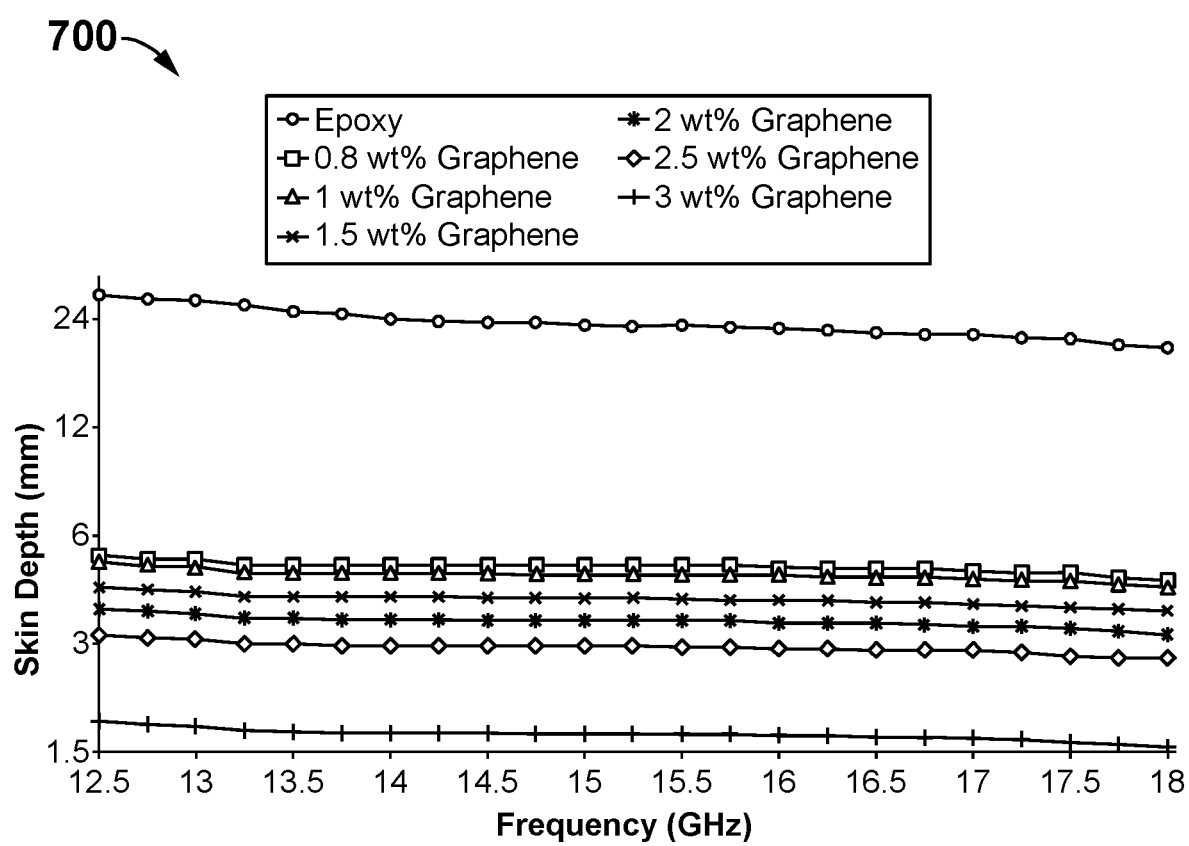
FIG. 7 exemplarily illustrates a skin depth of the coating composition in the Ku frequency band, according to one embodiment of the present invention.

Referring to FIG. 7, the skin depth 700 of the fabricated coating composition is disclosed, wherein the skin depth represents the required thickness of the coating composition for the proper performance of the antenna in Ku frequency band. From the results, it is evident that the skin depth decreases while increasing the graphene weight fraction in Ku frequency band. For example, the skin depth decreases from 28.2 mm in the pure resin coating to 1.82 mm in the coating composition incorporating 3% weight fraction of graphene at the frequency of 12.5 GHz. Further, the skin depth reaches to 1.55 mm in the frequency of 18 GHz. Although the required 1.82 mm for the thickness of the coating composition with 3% of graphene weight fraction is considerably higher than the required 0.611 m for an aluminum antenna, it is a remarkable value for the nanocomposite coating composition. This shows that applying 2 mm of the fabricated coating composition with 3% of graphene weight fraction could ensure the proper electromagnetic function of the antenna in Ku frequency band.

Figure 8:
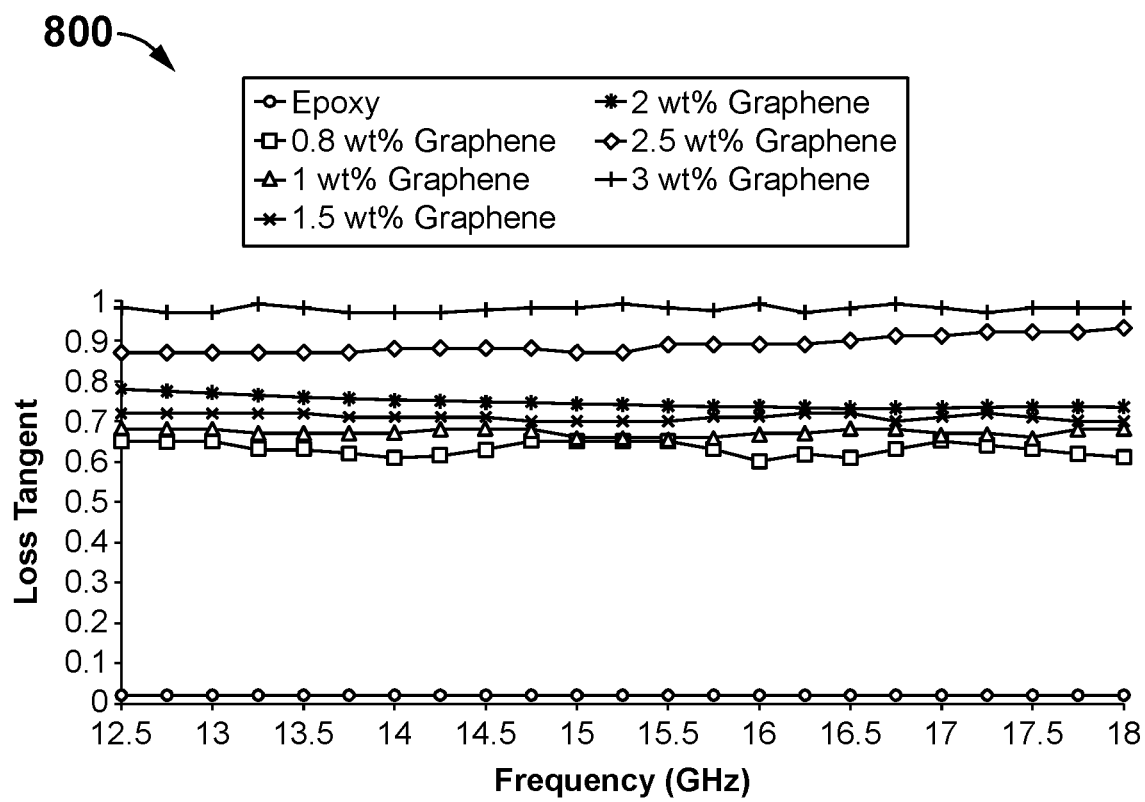
FIG. 8 exemplarily illustrates a loss tangent of the coating composition in the Ku frequency band, according to one embodiment of the present invention.

Referring to FIG. 8, the loss tangent 800 of the coating composition is disclosed in Ku frequency band. In one embodiment, the absorbability of the electromagnetic wave is investigated based on the loss tangent. The loss tangent of the coating composition with 2.5% of graphene is very close to 0.9, which reaches unity by adding 3% weight fraction of graphene to the polymer resin. It describes that the fabricated coating composition is capable of reflecting waves with very low absorbability, whereas the polymer resin is intrinsically categorized as electromagnetic absorbent.

According to the experimental measurements and calculations, the results describe that the fabricated nanocomposite coating composition performs efficiently for the transmission/reception of antenna reflectors in Ku frequency band. The fabricated coating composition is easily applied on the surface of the composite antenna instead of using traditional methods like embedding metallic mesh or manufacturing the antenna totally from metallic materials. Thus, a considerable weight reduction is achieved while electromagnetic properties are kept in its proper status. The invented coating composition presents the proper permittivity and very low required skin depth.

The very low skin depth shows that a very low thickness of coating is required to be applied on the surface of the antenna. Besides, the coating composition has a negligible loss tangent of the coating, which implies its outstanding performance in reflecting electromagnetic waves in Ku frequency band. Therefore, the developed coating composition could efficiently serve with very good reflective property and negligible absorbability of waves in composite antennas.

In the present invention, the graphene nanoparticles are incorporated into the polymer resin for achieving proper electromagnetic behavior at a specific frequency band of Ku for various applications such as satellite communications and broadcasting. The incorporated graphene nanoparticles account for any improvement in electromagnetic characteristics of polymeric resin without the usage of any other additional additive or filler. Moreover, the employed fabrication procedure is different from existing procedures, where the proper duration of the sonication process also plays a crucial role in target values. The present invention focuses on a specific frequency band, such as Ku frequency band. In this range of frequency, the antenna efficiently transmits/reflects the electromagnetic waves.

According to the present invention, the nanocomposite composition is developed for composite antennas. The composite antenna could be easily installed, maintained and repaired. The composite coated antenna exhibits proper electromagnetic behavior in a specific frequency band such as Ku frequency band. Also, it eliminates electromagnetic interference. The weight of the antenna is almost unchanged after applying the nanocomposite coating composition. The electromagnetic performance of the coating could be tuned by changing the contents of graphene without adding any additional metallic mesh or filler.

The fabricated coating is applied on the antenna reflector, which is employed for satellite communication and broadcasting in Ku frequency band. Further, it has the ability to be extended to some other telecommunication field due to its frequency selection feature. The coating composition could be used with antennas of ground stations and satellites. Also, it could be utilized in mountain-like spaces where heavy antennas are very hard to be installed and erected.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method.

Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

What is claimed is:

1. A method of preparing a nanocomposite coating composition for an antenna reflector, comprising:
    a. preparing a polymer resin by adding a hardener to an epoxy resin selected upon an organic synthetic compound;
    b. preparing a mixture of pure graphene and acetone solvent by dispersing a pre-defined amount of pure graphene to acetone solvent using an ultrasonic disperser for a period of about 2-10 minutes;
    c. adding the polymer resin to the mixture and stirring for a pre-defined period of time to form a graphene incorporated polymer resin mixture;
    d. performing a sonication process to the graphene incorporated polymer resin mixture;
    e. evaporating the acetone solvent from the mixture obtained from step (d) using a magnetic stirrer;
    f. mixing more of the same hardener to the mixture obtained from step (e) using a mechanical stirrer, and
    g. degassing the mixture obtained from step (f) using a vacuum oven to obtain the nanocomposite coating composition.

2. The method of claim 1, wherein the organic synthetic compound is Bisphenol-A.

3. The method of claim 1, wherein the hardener is added to the polymer resin at a ratio of about 1:10 and stirred for a period of about 3 minutes.

4. The method of claim 1, wherein the polymer resin has a density of about 1.6 gr/cm3 with the viscosity of about 780 cP at room temperature.

5. The method of claim 1, wherein the electrical conductivity of the polymer resin is $10^\wedge\text{-}12$ S/m.

6. The method of claim 1, wherein the graphene incorporated polymer resin mixture is stirred using a mechanical stirrer with 1700 RPM for a duration of about 15 minutes.

7. The method of claim 1, wherein the sonication process is performed for a period of about 30-120 minutes based on the weight fraction of the graphene incorporated polymer resin mixture.

8. The method of claim 1, wherein the nanocomposite coating composition is fabricated with 0.01%-3% of pure graphene weight fraction.

9. The method of claim 1, wherein the nanocomposite coating composition converts an electromagnetically insulated antenna into an electromagnetically conductive antenna for enhancing one or more electromagnetic characteristics of the antenna reflector in the range of Ku frequency band by applying 2 mm of coating containing 3 wt % of pure graphene representing unity tangent loss.

\* \* \* \* \*